(12) United States Patent
Iyer et al.

(10) Patent No.: US 8,593,253 B2
(45) Date of Patent: Nov. 26, 2013

(54) SYSTEMS AND METHODS FOR EFFICIENT AUTHENTICATION

(75) Inventors: Aravind V. Iyer, Bangalore (IN); Bhargav R. Bellur, Bangalore (IN)

(73) Assignee: GM Global Technology Operations, Inc., Detroit, MI (US)

( * ) Notice: Subject to any disclaimer, the term of this patent is extended or adjusted under 35 U.S.C. 154(b) by 840 days.

(21) Appl. No.: 12/797,116

(22) Filed: Jun. 9, 2010

(65) Prior Publication Data

US 2011/0304425 A1 Dec. 15, 2011

(51) Int. Cl.
*G05B 19/00* (2006.01)

(52) U.S. Cl.
USPC ......... 340/5.8; 340/572.1; 340/903; 713/168; 713/169; 713/171; 713/175; 713/176

(58) Field of Classification Search
USPC ........ 340/5.8, 572.1, 903; 713/168, 169, 171, 713/175, 176
See application file for complete search history.

(56) References Cited

U.S. PATENT DOCUMENTS

| | | | |
|---|---|---|---|
| 6,542,469 B1 * | 4/2003 | Kelley et al. ................... 370/238 |
| 6,804,199 B1 * | 10/2004 | Kelly et al. .................... 370/238 |
| 6,845,091 B2 * | 1/2005 | Ogier et al. ..................... 370/338 |
| 6,954,790 B2 * | 10/2005 | Forslow ......................... 709/227 |
| 7,031,288 B2 * | 4/2006 | Ogier ............................. 370/338 |
| 7,155,518 B2 * | 12/2006 | Forslow ......................... 709/227 |
| 7,305,459 B2 * | 12/2007 | Klemba et al. ................. 709/220 |
| 7,522,731 B2 * | 4/2009 | Klemba et al. ................. 380/285 |
| 7,698,463 B2 * | 4/2010 | Ogier et al. .................... 709/242 |
| 7,741,086 B2 * | 6/2010 | Shi et al. ........................ 435/183 |
| 7,768,926 B2 * | 8/2010 | Bellur et al. .................... 370/238 |
| 7,916,666 B2 * | 3/2011 | Yoon et al. ..................... 370/255 |
| RE42,871 E * | 10/2011 | Forslow ......................... 709/227 |
| 8,090,949 B2 * | 1/2012 | Bellur et al. ................... 713/175 |
| 8,194,550 B2 * | 6/2012 | Shorey et al. ................. 370/235 |
| 8,300,553 B2 * | 10/2012 | Nimon et al. .................. 370/254 |
| 8,323,941 B2 * | 12/2012 | Shi et al. ........................ 435/183 |
| 8,385,231 B2 * | 2/2013 | Rojas-Cessa et al. ........ 370/256 |
| 8,452,969 B2 * | 5/2013 | Iyer et al. ...................... 713/176 |
| 2002/0012320 A1 * | 1/2002 | Ogier et al. .................... 370/252 |
| 2002/0062388 A1 * | 5/2002 | Ogier et al. .................... 709/238 |
| 2002/0069278 A1 * | 6/2002 | Forslow ......................... 709/225 |
| 2002/0133534 A1 * | 9/2002 | Forslow ......................... 709/200 |
| 2007/0211636 A1 * | 9/2007 | Bellur et al. ................... 370/238 |
| 2009/0170796 A1 * | 7/2009 | Shi et al. .......................... 514/44 |
| 2009/0235071 A1 * | 9/2009 | Bellur et al. ................... 713/158 |
| 2009/0254754 A1 * | 10/2009 | Bellur et al. ................... 713/176 |
| 2010/0201543 A1 * | 8/2010 | Shorey et al. ................. 340/902 |
| 2010/0240733 A1 * | 9/2010 | Shi et al. ..................... 514/44 A |
| 2011/0035150 A1 * | 2/2011 | Sundarraj et al. ............. 701/301 |
| 2011/0066859 A1 * | 3/2011 | Iyer et al. ...................... 713/176 |
| 2011/0075566 A1 * | 3/2011 | Bellur et al. ................... 370/238 |

(Continued)

FOREIGN PATENT DOCUMENTS

WO   WO 2007103837 A1 *   9/2007
WO   WO 2010037001 A2 *   4/2010

*Primary Examiner* — George Bugg
*Assistant Examiner* — Paul Obiniyi
(74) *Attorney, Agent, or Firm* — Parks IP Law LLC

(57) ABSTRACT

A communication system is configured to operate in an ad hoc wireless network. The communication system includes a transmission device configured to send and receive a message, a signing module configured to generate a hierarchical signature using the message, and a verifying module configured to hierarchically verify a predetermined portion of a hierarchically signed message.

18 Claims, 2 Drawing Sheets

(56) References Cited

U.S. PATENT DOCUMENTS

| | | | |
|---|---|---|---|
| 2011/0236894 A1* | 9/2011 | Rao et al. | 435/6.11 |
| 2011/0238997 A1* | 9/2011 | Bellur et al. | 713/176 |
| 2011/0258435 A1* | 10/2011 | Bellur et al. | 713/158 |
| 2011/0304425 A1* | 12/2011 | Iyer et al. | 340/5.8 |

* cited by examiner

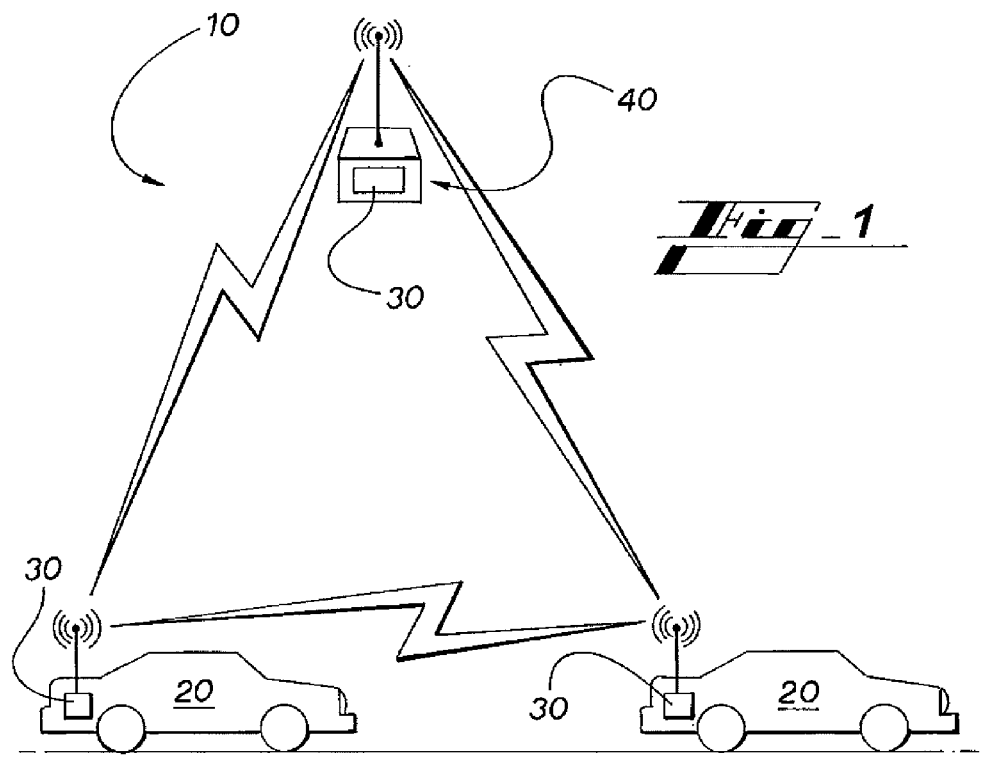
Fig_1
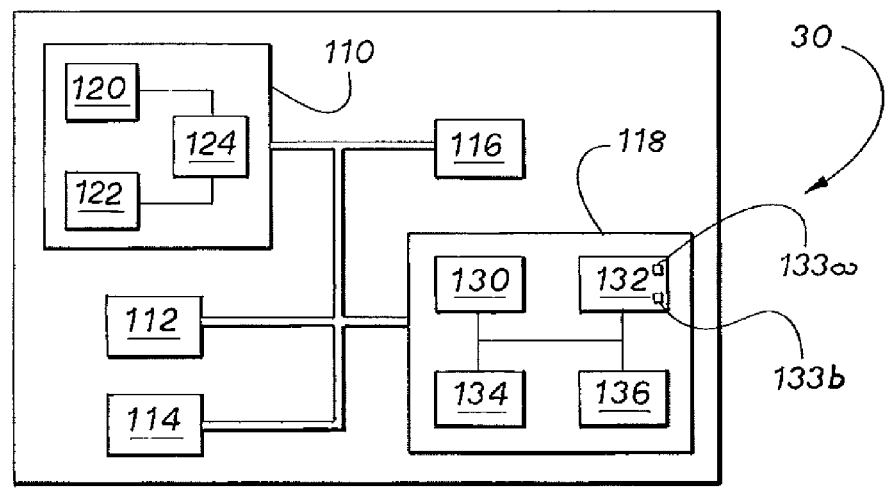
Fig_2

SYSTEMS AND METHODS FOR EFFICIENT AUTHENTICATION

TECHNICAL FIELD

This disclosure relates generally to systems and methods using efficient authentication protocols.

BACKGROUND

Vehicles use vehicle to vehicle (V2V) wireless communication systems and methods to send messages to one another. These messages, or alerts or notifications derived from these messages, may be shown to drivers through a heads-up display to assist or forewarn drivers. As drivers base their driving maneuvers on messages that are received through the V2V systems, the messages should be verified in a timely manner.

Currently used authentication protocols follow the hash-and-sign paradigm. These protocols may require a significant amount of time to verify the digital signature of a message, particularly where resource-constrained V2V systems are used. The hash and sign paradigm "hashes" all the fields of the message into a single message digest of a constant number of bits, and the entire message has to be verified before it can be determined if any part of the message is relevant. Authentication in this manner is a computationally intensive process that is not well-suited for V2V wireless communication or other time sensitive applications.

Therefore, a heretofore unaddressed need exists in the industry to address the aforementioned deficiencies and inadequacies. What is needed are systems and methods for efficiently authenticating V2V wireless communications.

SUMMARY

The various embodiments of the present disclosure overcome the shortcomings of the prior art by providing systems and methods for efficiently authenticating a message. The systems and methods can be used to quickly verify imprecise information. Imprecise information can then be evaluated for relevance to determine a response to the message before verifying it to its full precision, or even to determine whether further verification is necessary.

According to an exemplary embodiment, a communication system that is configured to operate in an ad hoc network includes a transmission device configured to receive a message and a verifying module that stores instructions for hierarchically verifying a predetermined portion of a message.

According to another exemplary embodiment, a communication system that is configured to operate in an ad hoc network includes a transmission device configured to transmit a message and a signing module configured to generate a hierarchical signature using the message.

As used herein, the term "mobile ad hoc network" refers to a self configuring network including mobile devices connected by wireless links. In general, each mobile device in a mobile ad hoc network is free to move in any direction and can frequently link to and de-link from other mobile and fixed devices. Each device can also operate as a router and forward information unrelated to its own systems or use. In the exemplary embodiments described herein, the devices are associated with vehicles or roadside equipment. Such a network is more specifically known as a "vehicular ad hoc network."

As used herein, the term "encoding" refers to the process of conversion of sensor or Global Positioning System (GPS) receiver input into a computer-readable form. Hierarchical encoding results in a set of symbols (e.g. n symbols). Each symbol has a significance associated with it which is the maximum extent to which it can improve the precision of the information. For decoding or interpreting the data, one could use the full set of n symbols or the k most significant symbols.

As used herein, the term "authentication" refers to a two-way protocol by means of which a sender communicates information to a receiver (or set of receivers) in such a way that the receiver(s) knows the information is coming from that particular sender, and that it has not been tampered with in transit. Authentication is accomplished by signing at the sender's end and verification at the receiver's end.

As used herein, the term signing refers to the process of producing a signature to be appended to the message.

As used herein, the term verification refers to the process of ascertaining whether the signature on a message is valid or not. According to an exemplary method, the verification process can verify only those fields that are deemed necessary by the application and to only that level of precision as deemed necessary.

The foregoing has broadly outlined some of the aspects and features of the present disclosure, which should be construed to be merely illustrative of various potential applications. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a schematic illustration of a mobile ad hoc network including devices associated with vehicles and a road side unit according to an exemplary embodiment of the disclosure.

FIG. 2 is a schematic illustration of a vehicle communication system or device according to an exemplary embodiment of the disclosure.

DETAILED DESCRIPTION

Figure 3:
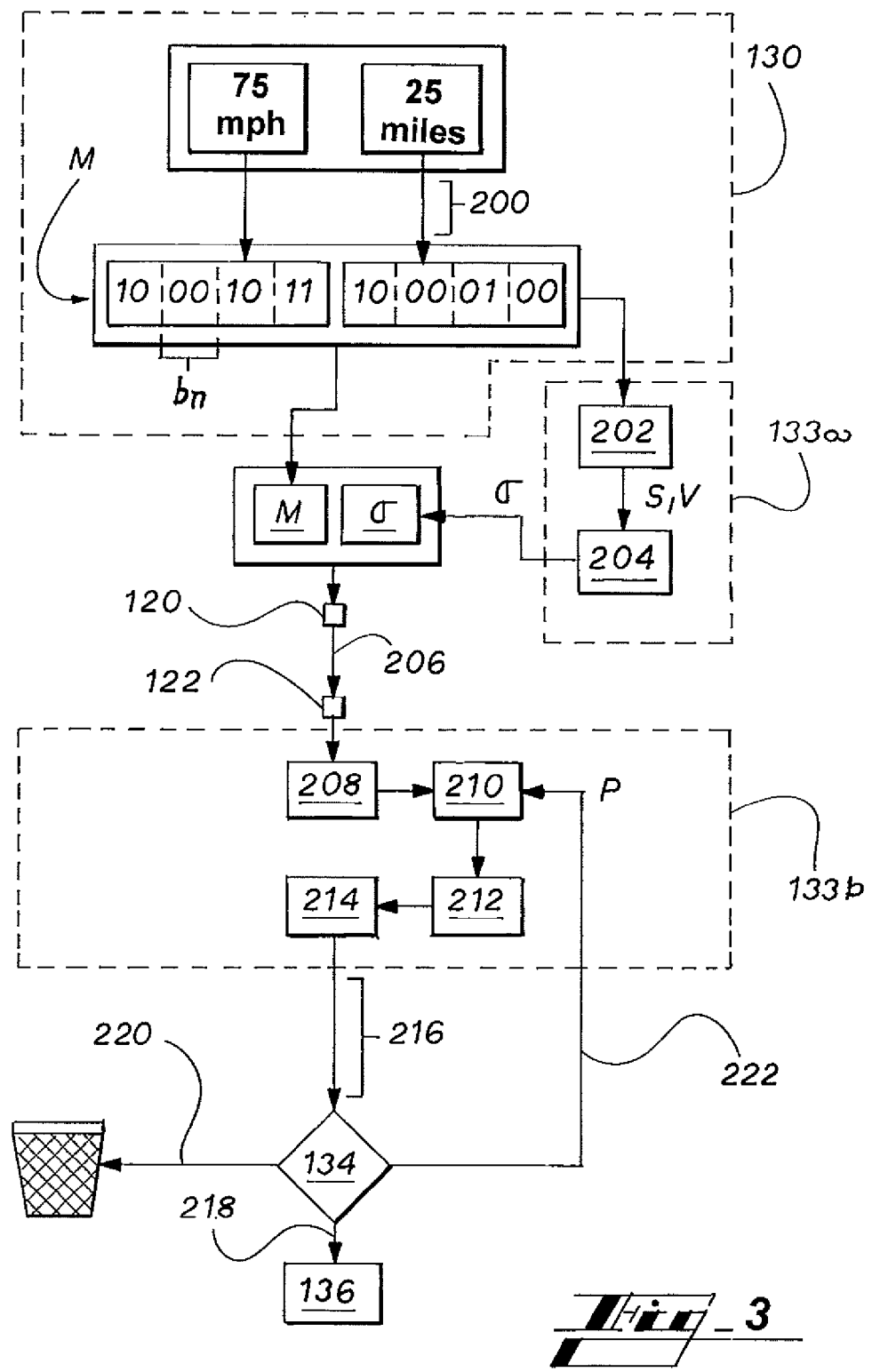
FIG. 3 is a schematic illustration of a frugal authentication method according to an exemplary embodiment of the disclosure.

As required, detailed embodiments are disclosed herein. It must be understood that the disclosed embodiments are merely exemplary of the disclosure that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The systems and methods are illustrated herein in the context of vehicle to vehicle (V2V) wireless communication. However, it should be understood that the systems and methods are not limited to V2V wireless communication. Rather, the systems and methods are applicable, for example, to communication networks where nodes may require information about one another, at varying degrees of precision and at different points in time. Such communication networks include sensor networks described in further detail below.

Referring to FIG. 1, an exemplary mobile ad hoc network 10 is illustrated. The illustrated network 10 includes vehicles 20 and a road side unit (RSU) 40, each with a communication device or system 30. In general, vehicles 20 and RSUs 40 within a certain distance of one another link to one another and each is a node in the network 10. The RSU 40 broadcasts messages relaying information about road conditions, traffic safety, and the like to passing vehicles 20. The RSU 40 can also receive data from vehicles 20 such as speed, identity, distress signals, and the like.

The communication systems 30 can use wireless protocols such as dedicated short range communications (DSRC) channels based on wireless local area network (WLAN) technology, IEEE 802.11, IEEE 802.11b, and the like. Communication between vehicles 20 is generally referred to as "vehicle to vehicle" (V2V) communication and communication between vehicles 20 and road side units (RSU) 40 is generally referred to as "vehicle to infrastructure" (V2I) communication.

Referring to FIG. 2, the illustrated communication system 30 includes a transmission device 110, a sensors interface 112, a vehicle systems interface 114, a processor 116, and a memory 118. The transmission device 110 includes a transmitter 120, a receiver 122, and an antenna 124. The transmission device 110 is configured to send and receive messages and associated cryptographic material. Messages can be sent repeatedly or based on triggering events and may include pieces of information such as kinematics (speed, acceleration, position, direction, time, etc.), traction, stability, safety advisories, and the like. Each piece of information corresponds to a field of the message. The information is generated by sensors that interface to the sensors interface 112 and vehicle systems that interface to the vehicle systems interface 114.

Exemplary sensors include a speedometer, an accelerometer, fuel gauge, a digital compass, a digital clock, and the like. Exemplary vehicle systems include GPS systems, braking systems, electrical systems, signal light systems, control systems, audio systems, electronic stability control systems such as Stabilitrak®, security, communications, and diagnostics systems such as OnStar®, and the like.

The memory 118 is a computer-readable medium that stores software modules and each of the software modules includes instructions or methods that are executed by the processor 116. Illustrated software modules include an encoding module 130, an authentication module 132, an evaluation module 134, and a response module 136. The encoding module 130 includes instructions for encoding information and the authentication module 132 includes instructions for signing and verifying a message. Authentication module 132 includes a signing module 133a with instructions for signing a message and a verifying module 133b with instructions for verifying a message. The evaluation module 134 includes instructions for determining if a verified message includes relevant information. As used herein and described in further detail below, relevant information is that which can be used to identify or rule out an event. The response module 136 includes instructions for responding to an event identified by the evaluation module 134.

A protocol termed "frugal authentication" utilizes hierarchical encoding and hierarchical authentication. As described in further detail below, information is hierarchically encoded as a message by the encoding module 130 and a hierarchical signature is generated by the signing module 133a. The message and hierarchical signature are transmitted from a sender to a receiver. The message is hierarchically verified by the verifying module 133b of the receiver using the hierarchical signature. Using frugal authentication, it is not necessary for the verifying module 133b to verify an entire message before evaluating information contained in the message. Frugal authentication allows part of a message to be verified by the verifying module 133b, which takes less time than verifying the entire message but generally requires a sacrifice of precision of the information. Further described, where binary encoding is used, frugal authentication allows one group of bits that make up part of a message to be verified without necessarily verifying another group of bits that make up another part of the message.

Frugal authentication allows the verifying module 133b to tradeoff precision or resolution of information resulting from a verification process in exchange for a reduction in the time it takes to verify a message with the verification process. The time-precision tradeoff can be optimized to efficiently focus computing resources on the most relevant information in the message. For example, the verifying module 133b can quickly verify part of a message to gain imprecise information before the evaluation module 134 decides whether to expend computational resources to verify the message to gain more precise information. In general, the precision of the information increases or decreases as a function of the amount of the message that is verified.

Referring to FIGS. 2 and 3, an exemplary method of hierarchically encoding information as a message is now described. The encoding module 130, now described in further detail, includes instructions to hierarchically encode information. Hierarchically encoded information is ordered or arranged according to significance and can be imprecisely represented. As used herein, the term significance refers to the parts of the message that convey the most precise information or that improves the precision of the information by the greatest amount.

Binary encoding is an example of a protocol that hierarchically encodes information into an L-bit message M. The information can be imprecisely represented by the N most significant of the L bits (N<L). As mentioned above, the precision of the imprecise information improves as the number of bits N nears L bits. For purposes of illustration, N bits of a message M that represents imprecise information is denoted as imprecise message $M_N$.

Hierarchically encoded information can be broken up into groups of bits that are referred to herein as "words." For example, the L-bit message M can be broken into a number n of k-bit words (L=n*k). Here, the first kbit word is the most significant and the last k-bit word is the least significant. The first j words are an imprecise representation of the information of the L-bit message and the precision improves as j nears n (j<n). Using binary encoding, verifying j k-bit words takes time proportional to j but provides information with a precision or resolution of $2^{-jk}$. Further described, the most significant words provide the most precision in the least time. For purposes of illustration, a j word message $M_j$ is an imprecise representation of the information in message M.

Referring to FIG. 3, an exemplary hierarchical encoding method is now described. The encoding module 130 includes instructions for performing the steps of the method. According to a step 200, precise pieces of information (e.g., 75 mph, 25 meters) are converted into fields of an L-bit message $M \in \{0,1\}^L$ (e.g., 1001011) and the hierarchically encoded message M is split into n words denoted by $b_1, b_2, \ldots, b_n$.

Asymmetric key authentication is a term used to refer to authentication protocols which use two distinct keys: (i) a private key which is kept secret by the sender and is used to generate the signature on a message; and (ii) a public key which is published or distributed to the receiver(s) of the communication, and is used by the receiver(s) to verify the signature on a message. In contrast, symmetric key authentication uses a single key (known as a shared key) which is kept secret by the sender and the receiver, and is used to both generate and verify signatures on messages. With regard to frugal authentication, the public keys corresponding to each message signed are communicated authentically to the receiver. Methods that enable authentic distribution of public keys to receivers use a public key infrastructure (PKI) along with signature algorithms such as RSA, ECDSA, etc.

An exemplary hierarchical signing method according to frugal authentication is now described. The signing module 133a includes instructions for performing the steps of the method. According to a step 202, a public key V and a private key S are generated using the number of words n and the number of bits k of each word. 2n random variables $s_1, s_2, \ldots, s_n$ and $c_1, c_2, \ldots, c_n$ are generated and the private key S is set as the 2n random variables $S=\{s_1, s_2, \ldots, s_n, c_1, c_2, \ldots, c_n\}$. To generate the public key V, a one way hash function H is used. For example, Winternitz one-time signatures can be used to sign k-bit words independently of the other k-bit words. For each i in a set $i \in \{1,n\}$, $X_i = H^{2^k}(s_i)$ and $Y_i = H^{2^k}(c_i)$ are generated and $Z_i$ is calculated as the hash of the concatenation of $X_i$ and $Y_i$ according to $Z_i = H(X_i \| Y_i)$. The public key V is then set as $V=[Z_1, Z_2, \ldots, Z_n]$. Here, the public key V and the private key S each have a part corresponding to each word b of the message M. According to a step 204, the private key S and the L-bit message M are used to generate a hierarchical signature a. For each i in a set $i \in \{1,n\}$, $\sigma = H^{b_i}(s_i)$ and $\gamma_i = H^{2^k - b_i}(c_i)$ are generated and the hierarchical signature $\sigma$ is given as $\sigma = \sigma_1 \| \ldots \| \sigma_n \| \gamma_1 \gamma \ldots \| \gamma_n$.

According to a step 206, the message M and associated cryptographic material, including the hierarchical signature $\sigma$ and the public key V, can then be transmitted by a transmitter 120 of a first vehicle 20 and received by a receiver 122 of a second vehicle 20.

Continuing with FIG. 3, an exemplary hierarchical verification method is now described. The verifying module 133b includes instructions for performing the steps of the method. The verifying module 133b verifies the message M once it, along with the hierarchical signature a, is received by the receiver 122. Here, the verifying module 133b uses the message M and the hierarchical signature a to verify that a p-word message $M_p$ originates from an authentic source and has not been tampered with during transit. The p-word message $M_p$ can be verified given the public key V, the L-bit message M, the hierarchical signature a, and the number of words p ($p \leq n$) to verify. The number of words p can initially be determined by the evaluation module 134 according to various functions of the sensor inputs or can initially be a constant supplied by the evaluation module 134. Here, the number of words p represents the precision of the resulting information with p=n representing precise information and p<n representing imprecise information. According to a step 208, the message M is broken into n kbit words denoted by $b_1, b_2, \ldots, b_n$ and the hierarchical signature a is broken into its components $\sigma_1, \sigma_2, \ldots, \sigma_n, \gamma_1, \gamma_2, \ldots, \gamma_n$. According to a step 210, the number of words p is received from the evaluation module 134 and the public key V is modified according to the number of words p and given as $V_p = [Z_1, Z_2, \ldots, Z_p]$. According to a step 212, a public key check $V_p'$ is generated. For each i in a set $i \in \{1,p\}$, $X_i' = H^{2^k - b_i}(\sigma_i)$ and $Y_i' = H^{b_i}(\gamma_i)$ are generated and $Z_i'$ is calculated as the hash of the concatenation of $X_i'$ and $Y_i'$ given by $Z_i' = H(X_i' \| Y_i')$. The public key check $V_p'$ is set as $V_p' = [Z_1', Z_2', \ldots, Z_p']$. According to a step 214, the public key Vp is compared to the public key check $V_p'$. If the public key $V_p$ matches the public key check $V_p'$ ($V_p = V_p'$), then the information in the p-word message $M_p$ is verified. Otherwise, the information in the p-word message $M_p$ is not verified. According to a step 216, if the p-word message $M_p$ is verified, the corresponding imprecise information is passed to the evaluation module 134.

The evaluation module 134, now described in further detail, includes instructions to determine if a response-triggering event can be identified and submitted to the response module 136 according to a step 218, if events can be ruled out and the message discarded according to a step 220, or if neither of these determinations can be made and the verifying module 133b should be instructed to verify the message M to gain more precise information according to a step 222. In the latter case, the evaluation module 134 determines a new number of words p that is greater than the initial number of words p and submits the new number of words p to the verifying module 133b as described above with respect to step 210. Then, more precise information is verified by the verifying module 133b and returned to the evaluation module 134 for evaluation. Response-triggering events include vehicles stopped ahead, vehicles traveling much slower ahead, vehicles braking hard ahead, vehicles entering an intersection from the side, vehicles traveling much faster behind, and the like.

Response-triggering events can be a function the pieces of information of the transmitting and receiving vehicles. For example, a collision event can be a function of the positions of the vehicles, a difference in speed between the vehicles, a distance between the vehicles, and the directions of the vehicles. Authenticated imprecise information gives range of possible values for each of the factors contributing to the collision event. If no possible values can be combined to indicate a collision event, the message M may be ignored according to the step 220. Alternatively, if the possible values combined in any manner indicate that a collision event has occurred or is likely to occur, the response module 136 is instructed to issue a response to a collision event according to the step 218. If some of the possible values can be combined to indicate a probable or actual collision event and some of the possible values can be combined to indicate the absence of a collision event, the verifying module 133b is instructed to verify the message M to gain more precise information according to the step 222 and then the evaluation process is repeated by the evaluation module 134.

The response module 136, now described in further detail, includes instructions for issuing a response to an event. Responses to events include signaling the driver to brake or change lanes, flashing lights to warn other drivers, transmitting a warning to other vehicles, and the like. As such, the instructions can operate vehicle systems through the vehicle systems interface 114.

Frugal authentication can be used in isolation or combined with other methods. Where the number of bits of a message is relatively high, frugal authentication can be limited to the most significant fields or the frugal authenticator can be combined with other mechanisms that use the hash-and-sign paradigm. As an example, a digital signature can authenticate absolute values of the fields and the frugal authenticator can authenticate relative or newly-changed values. Using these and other techniques, the overhead remains bounded and there is flexibility to quickly authenticate the most relevant information.

The systems and methods described herein are not limited to vehicle to vehicle applications but can also be applied, for example, in sensor networks. Sensor networks typically use sensor nodes which are typically battery-powered and are equipped only with a limited amount of memory and computational power. Sensor networks also use one (or a few) sink(s) which collect data observed by the sensors. According to an exemplary embodiment, a sensor network includes several sensors and a sink and is deployed to monitor temperature. The sink issues an alert if the temperature observed by a sensor is anomalous. In order to conserve energy, sensors respond only to queries from the sink, and only to those queries which are relevant. Sensors establish relevance and authenticity in an efficient or frugal manner. As an example, a query from a sink requests a temperature report if the temperature is between 110 and 115 degrees. Using frugal authentication, a sensor could, after one round of verification, find that the query range is 100 to 150 and that its temperature is outside that range, wherefore the message can be discarded. On the other hand if its temperature is in that range, another round of verification may reveal the query range to be 100 to 125, whereupon the sensor can continue performing the same logic to determine whether to report back, discard or verify further.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A communication system configured to operate in an ad hoc network, comprising:
    a transmission device configured to receive a message; and
    a verifying module configured to hierarchically verify a predetermined portion of the message, the verifying module being configured to:
        break the message into n k-bit words $b_1, b_2, \ldots, b_n$;
        break a hierarchical signature into components $\sigma_1, \sigma_2, \ldots, \sigma_n, \gamma_1, \gamma_2, \ldots, \gamma_n$;
        determine a number of words p;
        set a public key V to $V_p = [Z_1, Z_2, \ldots, Z_p]$;
        for each i in a set $i \in \{1, p\}$:
            generate $X_i' = H^{2^k - b_i}(\sigma_i)$ and $Y_i' = H^{b_i}(\gamma_i)$; and
            calculate $Z_i' = H(X_i' \| Y_i')$;
        set a public key check $V_p'$ to $V_p' = [Z_1', Z_2', \ldots, Z_p']$; and
        compare the public key $V_p$ to the public key check $V_p'$.

2. The communication system of claim 1, wherein the communication system is a vehicle communication system operating in a mobile ad hoc network.

3. The communication system of claim 1, wherein the communication system is configured to operate in a sensor network.

4. The communication system of claim 1, wherein the predetermined portion of the message is a number of words of the message.

5. The communication system of claim 1, further comprising a processor configured to execute instructions of the verifying module.

6. The communication system of claim 1, wherein the predetermined portion is more significant than the remainder of the message.

7. The communication system of claim 1, wherein the predetermined portion of the message corresponds at least one piece of imprecise information.

8. The communication system of claim 7, further comprising an evaluation module configured to identify an event based on the information.

9. The communication system of claim 8, the evaluation module being configured to instruct the verifying module to verify a portion of the message that is greater than the predetermined portion.

10. The communication system of claim 8, the evaluation module comprising instructions for ignoring the message.

11. The communication system of claim 8, further comprising a response module configured to generate a response to an identified event.

12. The communication system of claim 1, further comprising a signing module that is configured to generate a hierarchical signature.

13. The communication system of claim 1, wherein the message is hierarchically encoded as a number of bits that are grouped into words and the verifying module is configured to verify any number of words.

14. The communication system of claim 1, wherein if $V_p = V_p'$, then the message is verified.

15. A communication system configured to operate in an ad hoc network, comprising:
    a transmission device configured to transmit a message; and
    a signing module configured to generate a hierarchical signature using the message, the signing module being configured to generate the hierarchical signature by:
        dividing the message into n words $b_1, b_2, \ldots, b_n$;
        generating 2n random variables $s_1, s_2, \ldots, s_n$ and $c_1, c_2, \ldots, c_n$;
        setting a private key S as the 2n random variables $S = \{s_1, s_2, \ldots, s_n, c_1, c_2, \ldots, c_n\}$;
        for each i in a set $i \in \{1, n\}$:
            generating $X_i = H^{2^k}(s_i)$ and $Y_i = H^{2^k}(c_i)$; and
            calculating $Z_i = H(X_i \| Y_i)$;
        setting a public key V as $V = [Z_1, Z_2, \ldots, Z_n]$;
        for each i in a set $i \in \{1, n\}$:
            generating $\sigma_i = H^{b_i}(s_i)$ and $\gamma_i = H^{2^k - b_i}(c_i)$; and
            setting the hierarchical signature $\sigma$ as $\sigma = \sigma_1 \| \ldots \| \sigma_n \| \gamma_1 \| \ldots \| \gamma_n$.

16. The communication system of claim 15, wherein the communication system is a vehicle communication system operating in a mobile ad hoc network.

17. A non-transitory computer readable medium on which are stored executable authentication instructions for:
    signing a message for use by a communication system, comprising:
        dividing the message into n words $b_1, b_2, \ldots, b_n$;
        generating 2n random variables $s_1, s_2, \ldots, s_n$ and $c_1, c_2, \ldots, c_n$;
        setting a private key S as the 2n random variables $S = \{s_1, s_2, \ldots, s_n, c_1, c_2, \ldots, c_n\}$;
        for each i in a set $i \in \{1, n\}$:
            generating $X_i = H^{2^k}(s_i)$ and $Y_i = H^{2^k}(c_i)$; and
            calculating $Z_i = H(X_i \| Y_i)$;
        setting a public key V as $V = [Z_1, Z_2, \ldots, Z_n]$;
        for each i in a set $i \in \{1, n\}$:
            generating $\sigma_i = H^{b_i}(s_i)$ and $Y_i = H^{2^k - b_i}(c_i)$; and
            setting a hierarchical signature $\sigma$ as $\sigma = \sigma_1 \| \ldots \| \sigma_n \| \gamma_1 \| \ldots \| \gamma_n$.

18. The non-transitory computer readable medium of claim 17, wherein the authentication instructions are further for verifying a message, used in a communication system, comprising:
    breaking the message into n k-bit words $b_1, b_2, \ldots, b_n$;
    breaking the hierarchical signature into components $\sigma_1, \sigma_2, \ldots, \sigma_n, \gamma_1, \gamma_2, \ldots, \gamma_n$;
    determining a number of words p;
    setting a public key V to $V_p = [Z_1, Z_2, \ldots, Z_p]$;
    for each i in a set $i \in \{1, p\}$:
        generating $X_i' = H^{2^k - b_i}(\sigma_i)$ and $Y_i' = H^{b_i}(\gamma_i)$; and
        calculating $Z_i' = H(X_i' \| Y_i')$;
    setting a public key check $V_p'$ to $V_p' = [Z_1', Z_2', \ldots, Z_p']$; and
    comparing the public key $V_p$ to the public key check $V_p'$.

* * * * *